United States Patent
Park

(10) Patent No.: US 7,665,387 B2
(45) Date of Patent: Feb. 23, 2010

(54) SHOCK ABSORBING DEVICE FOR BRAKE PEDALS

(75) Inventor: Dae-Deug Park, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 865 days.

(21) Appl. No.: 11/299,384

(22) Filed: Dec. 8, 2005

(65) Prior Publication Data

US 2007/0137394 A1    Jun. 21, 2007

(30) Foreign Application Priority Data

Nov. 11, 2005    (KR) .................. 10-2005-0108172

(51) Int. Cl.
  *G05G 1/30*      (2008.04)
  *B60K 28/10*    (2006.01)
(52) U.S. Cl. .................. 74/512; 180/271; 180/274
(58) Field of Classification Search ........... 74/512–514, 74/560; 180/274, 271; 73/117.01; *B60T 7/06; G05G 1/14*
  See application file for complete search history.

(56) References Cited

U.S. PATENT DOCUMENTS

| 4,938,057 | A * | 7/1990 | Yamazaki ............... 73/117.01 |
| 6,499,376 | B2 | 12/2002 | Thistleton et al. | |
| 6,571,900 | B2 * | 6/2003 | Thistleton ............... 180/274 |
| 7,228,759 | B2 * | 6/2007 | Jagger et al. ............ 74/512 |

FOREIGN PATENT DOCUMENTS

| EP | 1 323 602 A1 | 7/2003 |
| EP | 1 475 275 A2 | 11/2004 |
| EP | 1 479 578 A2 | 11/2004 |
| EP | 1 510 426 A2 | 3/2005 |
| JP | 2000-280874 A | 10/2000 |
| JP | 2003-112615 A | 4/2003 |
| JP | 2003-252186 B2 | 9/2003 |
| WO | WO 2004/026650 A1 * | 4/2004 |

* cited by examiner

*Primary Examiner*—Vinh T. Luong
(74) *Attorney, Agent, or Firm*—Morgan, Lewis & Bockius LLP

(57) ABSTRACT

A shock absorbing device includes a mounting bracket which is fastened at a first end thereof to the vehicle body and removably mounted at a second end thereof to the vehicle body, an upper pedal arm which is rotatably mounted to the mounting bracket using a hinge shaft, and a lower pedal arm which is removably coupled to the upper pedal arm using a locking pin. The shock absorbing device further includes a locking pin removal device which removes the lower pedal arm from the upper pedal arm when a vehicle collision occurs, and a guide device which serves as a guide for movement of the mounting bracket when the vehicle collision occurs and provides a reaction force for the locking pin removal device.

7 Claims, 13 Drawing Sheets

SHOCK ABSORBING DEVICE FOR BRAKE PEDALS

CROSS-REFERENCE TO RELATED APPLICATIONS

The present application is based on, and claims priority from, Korean Application Serial Number 10-2005-0108172, filed on Nov. 11, 2005, the disclosure of which is hereby incorporated by reference herein in its entirety.

FIELD OF THE INVENTION

The present invention relates to brake pedals for vehicles and, more particularly, to an shock absorbing device for a brake pedal which has a structure such that, when a frontal vehicle collision occurs, the brake pedal rotates in a forward direction of the vehicle, thus minimizing injury to the leg of a driver resulting from impact with the brake pedal.

BACKGROUND OF THE INVENTION

As well known to those skilled in the art, a brake system is provided in a vehicle to reduce the speed of the vehicle or to stop it. The brake system includes a brake pedal which is disposed near a driver, a brake booster which amplifies actuating force of the brake pedal, a master cylinder which generates hydraulic pressure using the amplified actuating force transmitted from the brake booster, and a brake body which brakes wheels using the hydraulic pressure transmitted from the master cylinder.

The brake pedal is supported underneath a dash panel, which divides an engine room from a passenger compartment, so as to be rotatable in forward and backward directions of the vehicle.

However, in the conventional brake system having the above-mentioned construction, if the vehicle, while traveling, frontally collides, the brake pedal supported underneath the dash panel is rotated towards the driver, so that the leg of the driver may strike the brake pedal, thus resulting in a severe injury to the driver.

To reduce injury to the driver due to the brake pedal in a vehicle frontal collision, various shock absorbing devices for brake pedals have been developed, but they have problems in that the structures thereof are complex or shock absorbing effect thereof is insufficient.

SUMMARY OF THE INVENTION

Embodiments of the present invention provide a shock absorbing device of a brake pedal which has a structure such that, when a frontal vehicle collision occurs, the brake pedal rotates in a forward direction of the vehicle, that is, in a direction moving away from a driver, thus reducing the speed of the collision of the driver's leg with the brake pedal, thereby minimizing injury to the driver.

A shock absorbing device for brake pedals according to an embodiment of the present invention includes a mounting bracket which is fastened at a first end thereof to a vehicle body and removably mounted at a second end thereof to the vehicle body. An upper pedal arm is rotatably mounted to the mounting bracket using a hinge shaft. A lower pedal arm is removably coupled to the upper pedal arm using a locking pin. A locking pin removal means removes the lower pedal arm from the upper pedal arm when a vehicle collision occurs. A guide means serves as a guide for movement of the mounting bracket when the vehicle collision occurs and provides a reaction force for the locking pin removal means.

The locking pin removal means includes an actuating pin and have a U shape. The locking pin removal means may be rotatably mounted to the upper pedal arm.

The guide means may be fastened to the vehicle body, and the mounting bracket may be coupled to the guide means such that the movement of the mounting bracket is guided by the guide means.

The guide means has an elliptical guide hole to limit moving distance of the hinge shaft in the vehicle collision.

The guide means has an inclined part which is curved in a predetermined direction to guide the actuating pin in the vehicle collision.

The shock absorbing device may further include a spacer which is mounted to the lower pedal arm and has a leaf spring, so that, when the vehicle collision occurs, the leaf spring is compressed by the locking pin removal means, thus rotating the lower pedal arm in a direction moving away from a driver using elasticity thereof.

The lower pedal arm may be coupled at a predetermined position thereof to a push rod of a brake booster, so that, when the vehicle collision occurs, the lower pedal arm is removed from the upper pedal arm and rotated around a joint between the lower pedal arm and the push rod of the brake booster.

The inclined part of the guide means may have an arc shape similar to an arc-shaped slot formed through the upper pedal arm.

BRIEF DESCRIPTION OF THE DRAWINGS

For a better understanding of the nature and objects of the present invention, reference should be made to the following detailed description with the accompanying drawings, in which.

DETAILED DESCRIPTION OF THE PREFERRED EMBODIMENTS

Hereinafter, an embodiment of the present invention will be described in detail with reference to the attached drawings.

Figure 1:
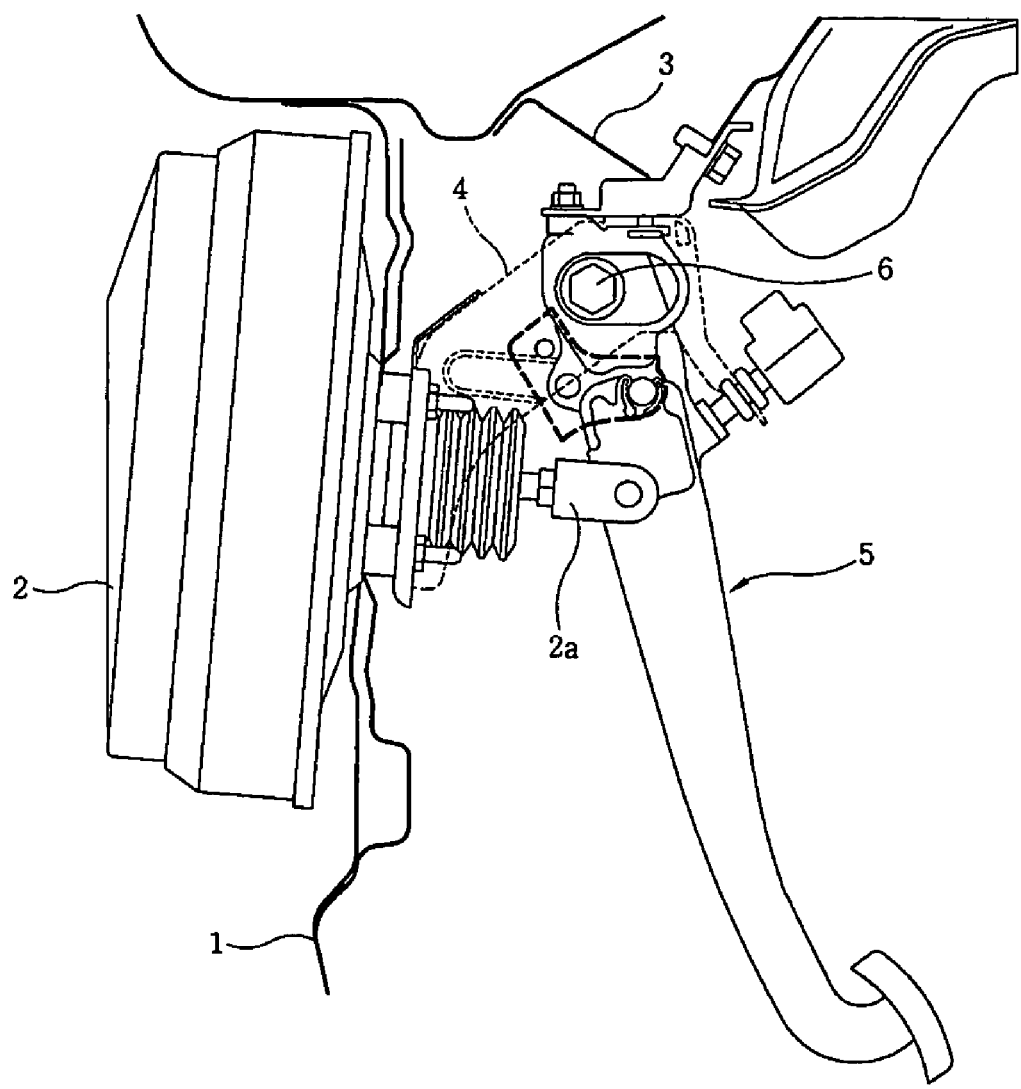
FIG. 1 is a side view showing a brake pedal provided with a shock absorbing device according to an embodiment of the present invention.

FIG. 1 shows a brake pedal 5 provided with a shock absorbing device according to the embodiment of the present invention. Referring to FIG. 1, a brake booster 2 is mounted to a dash panel 1. The brake pedal 5 is mounted to a mounting bracket 4, fastened to a vehicle body 3, so as to be rotatable around a hinge shaft 6 in forward and rearward directions with respect to the vehicle body 3. Furthermore, a push rod 2a of the brake booster 2 is coupled to the brake pedal 5.

Figure 2:
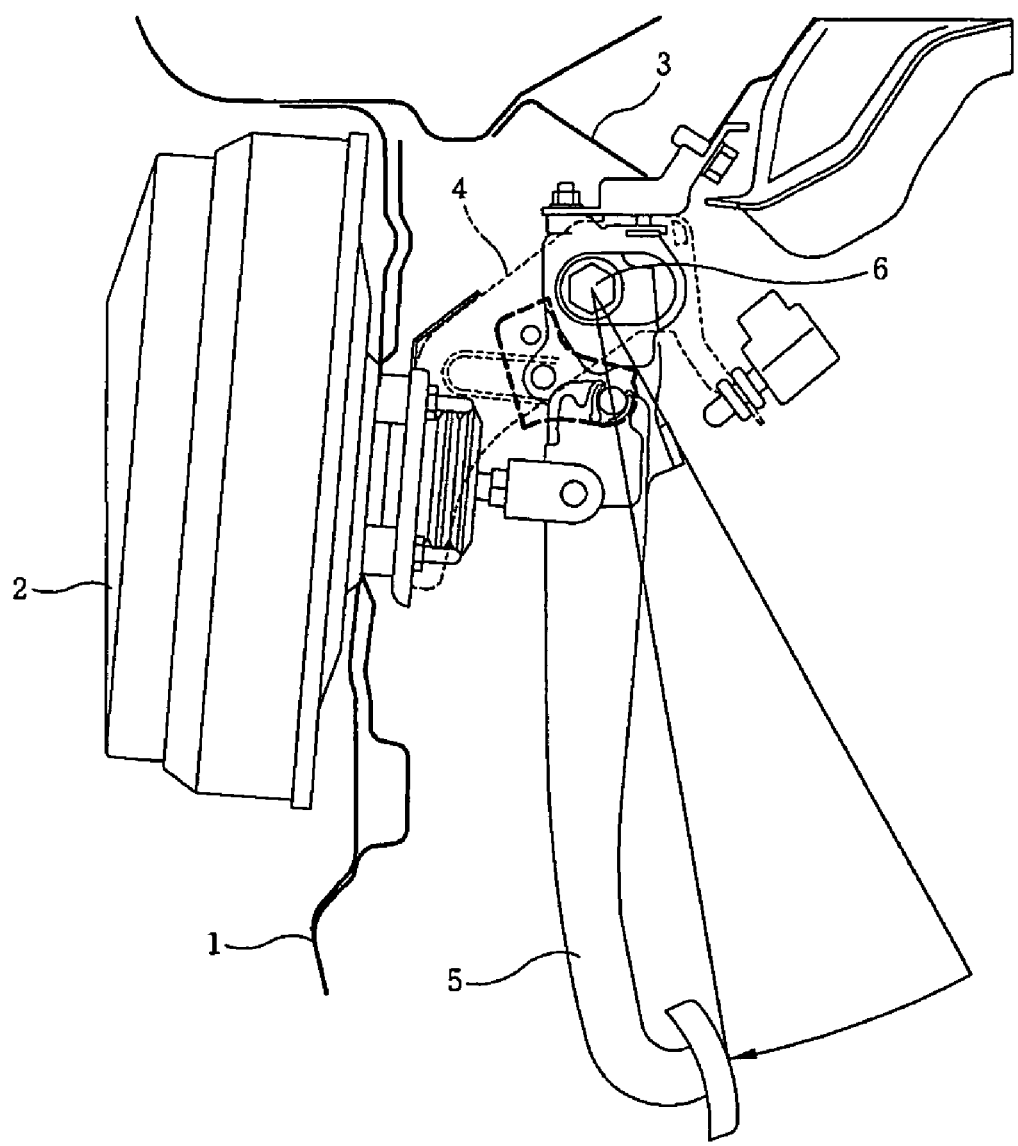
FIG. 2 is a side view showing the operation of the brake pedal having the shock absorbing device of FIG. 1.

When a driver manipulates the brake pedal 5, the brake pedal 5 is rotated in a forward direction of the vehicle body 3, as shown in FIG. 2. Then, the push rod 2a of the brake booster 2 is pushed forwards by the brake pedal 5, so that the brake booster 2 amplifies actuating force of the brake pedal 5 generated by the driver.

Figure 3:
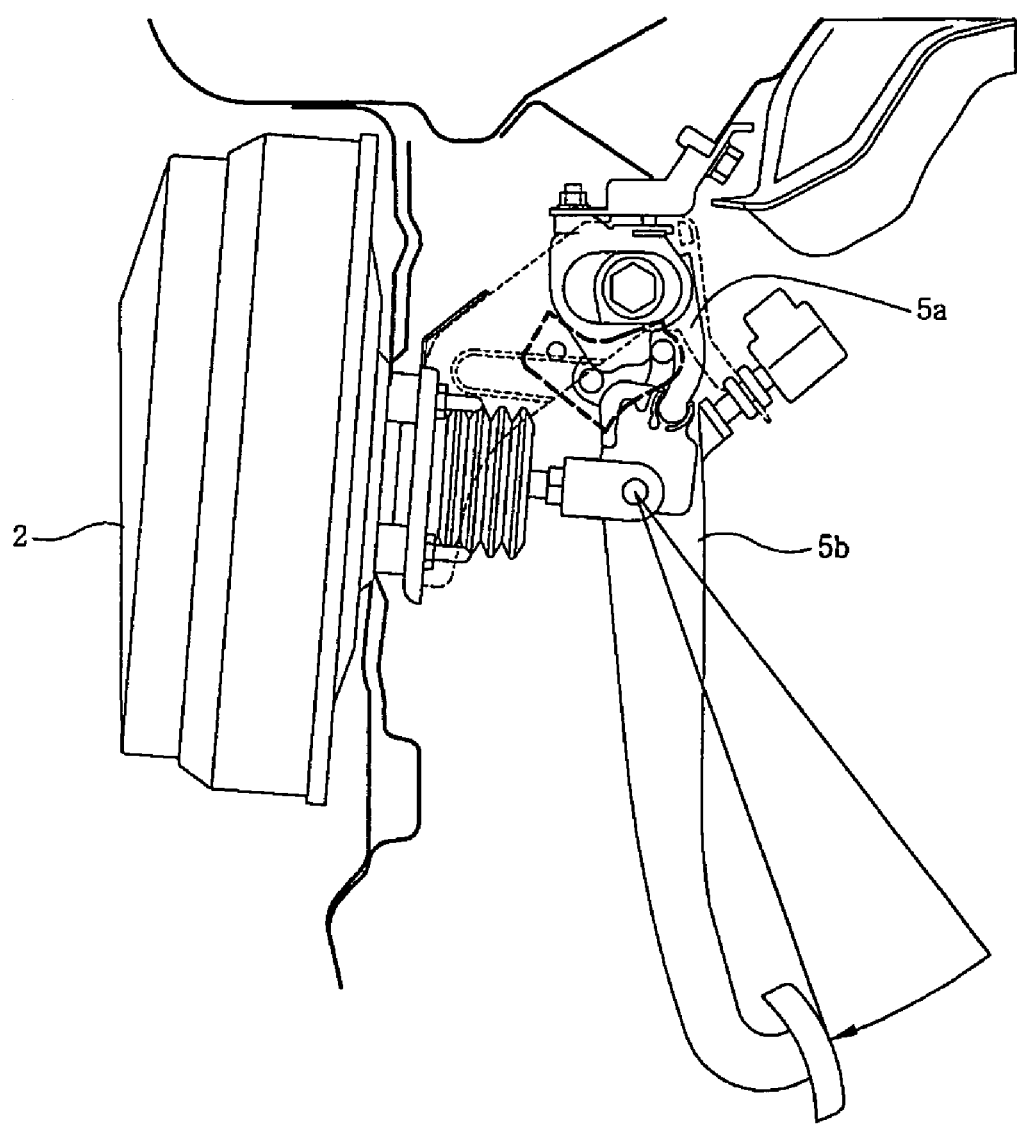
FIG. 3 is a side view showing the brake pedal rotated by the shock absorbing device of FIG. 1 in a direction moving away from a driver when a vehicle collision occurs.

FIG. 3 shows the brake pedal 5 rotated in a forward direction of the vehicle body 3 when a vehicle collision occurs. The brake pedal 5 includes an upper pedal arm 5a to which the hinge shaft 6 is mounted, and a lower pedal arm 5b which is removably coupled to the upper pedal arm 5a by a pin coupling method. If an impact is applied to the brake booster when the vehicle is in a frontal collision, the lower pedal arm 5b is removed from the upper pedal arm 5a and rotated around a joint, at which the lower pedal arm 5b is coupled to the push rod 2a, in a forward direction of the vehicle.

Therefore, when the frontal vehicle collision occurs, because the lower pedal arm 5b is rotated in a forward direction, that is, in a direction moving away from the driver, the speed of impact of the driver's leg against the brake pedal 5 is reduced, thus minimizing the injury to the leg of the driver resulting from impact with the brake pedal 5.

Figure 4:
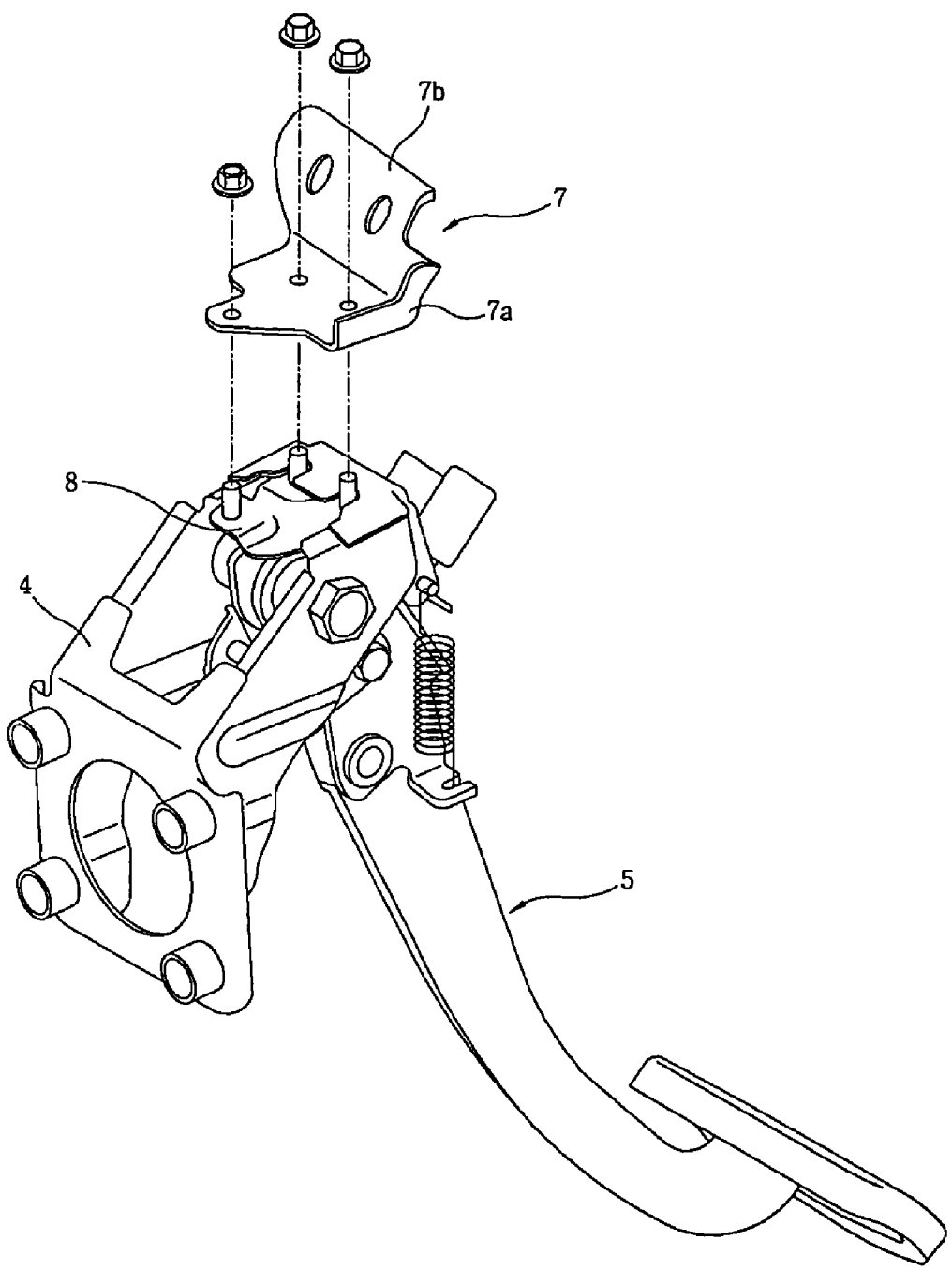
FIG. 4 is an exploded perspective view showing a vehicle body fastening bracket and the brake pedal having the shock absorbing device according to the present invention.
Figure 5:
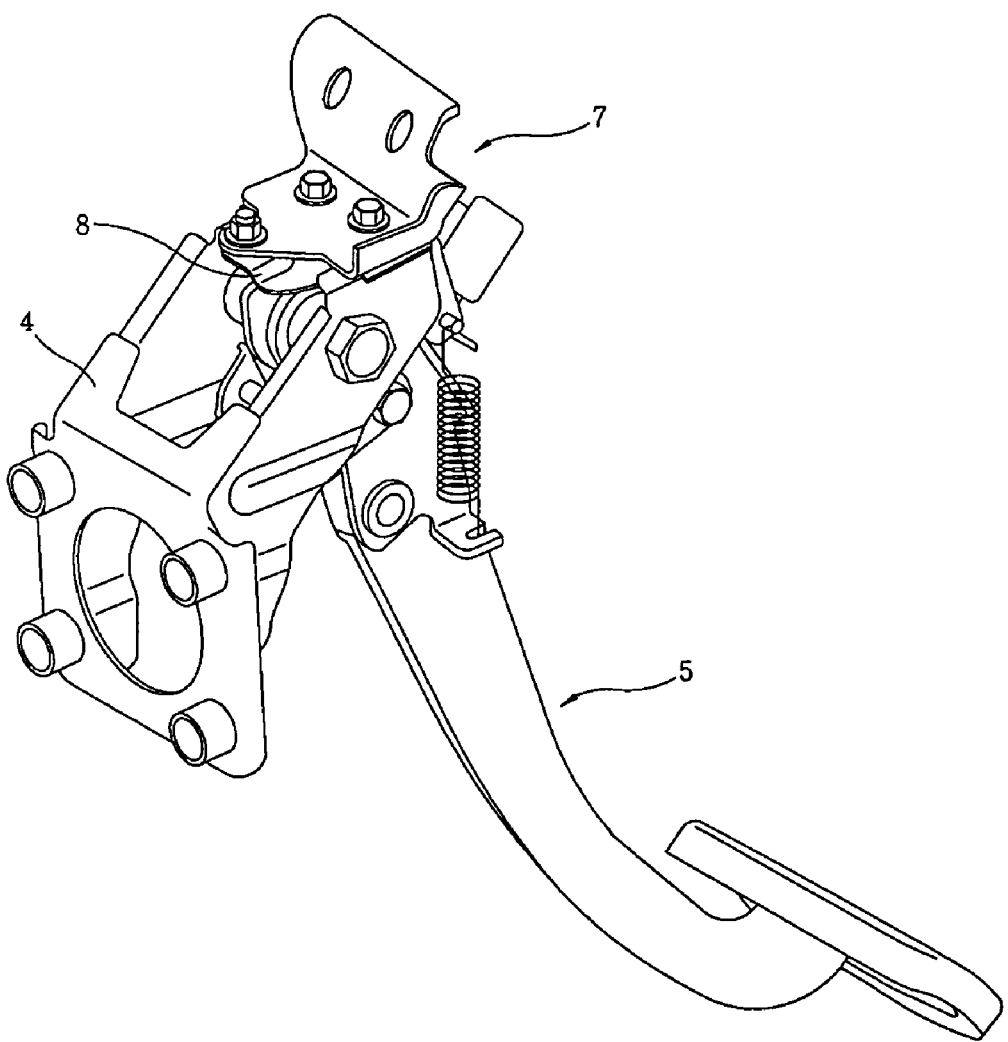
FIG. 5 is a perspective view showing the assembly of the vehicle body fastening bracket and the brake pedal having the shock absorbing device of FIG. 4.
Figure 6:
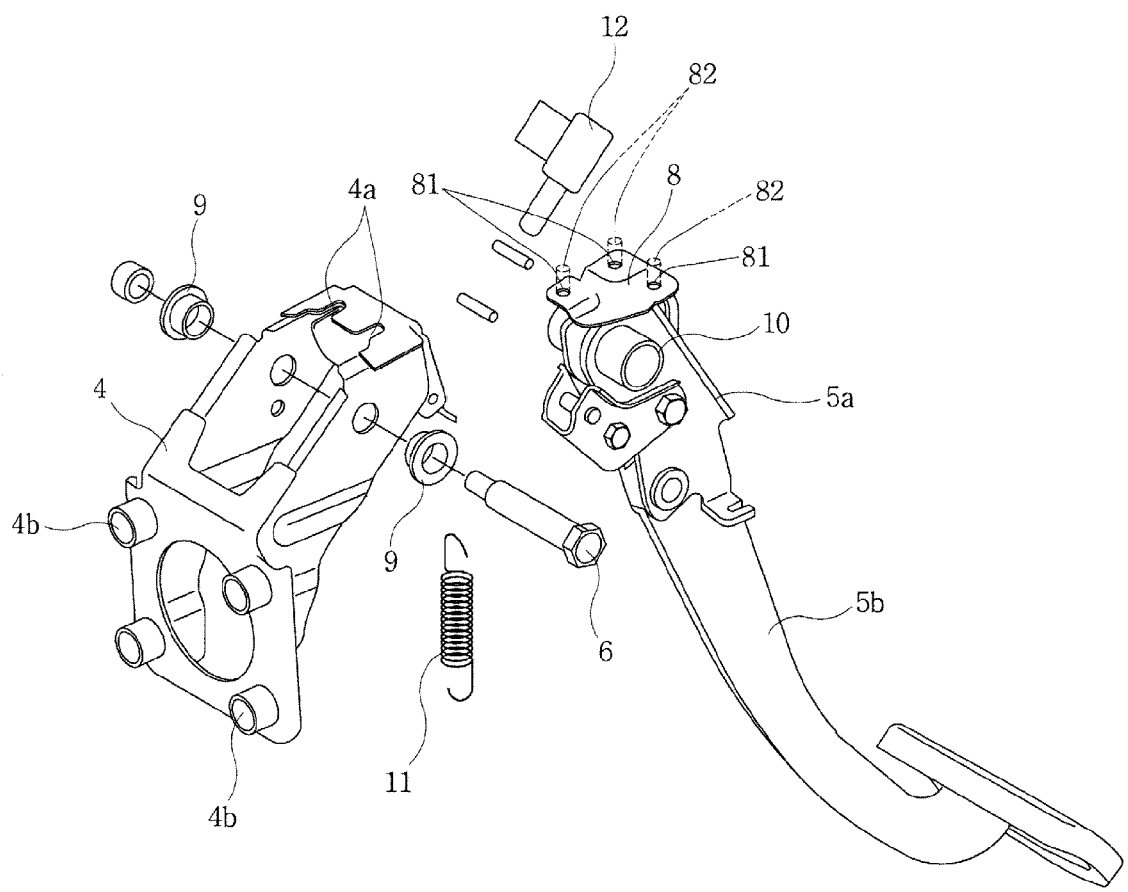
FIG. 6 is an exploded perspective view showing a mounting bracket and the brake pedal having the shock absorbing device according to the present invention.

FIGS. 4 through 6 show the mounting bracket 4 and a vehicle body fastening bracket 7. Two locking bolt insertion notches 4a and four locking bolt holes 4b, through which the mounting bracket 4 is mounted to the brake booster 2 using locking bolts, are formed at predetermined positions in the mounting bracket 4, as shown in detail in FIG. 6. The vehicle body fastening bracket 7 includes a first flange 7a through which three locking bolt holes are formed, and a second flange 7b which extends from the first flange 7a and is bent at a predetermined angle with respect to the first flange 7a, and through which two locking bolt holes are formed.

Figure 7:
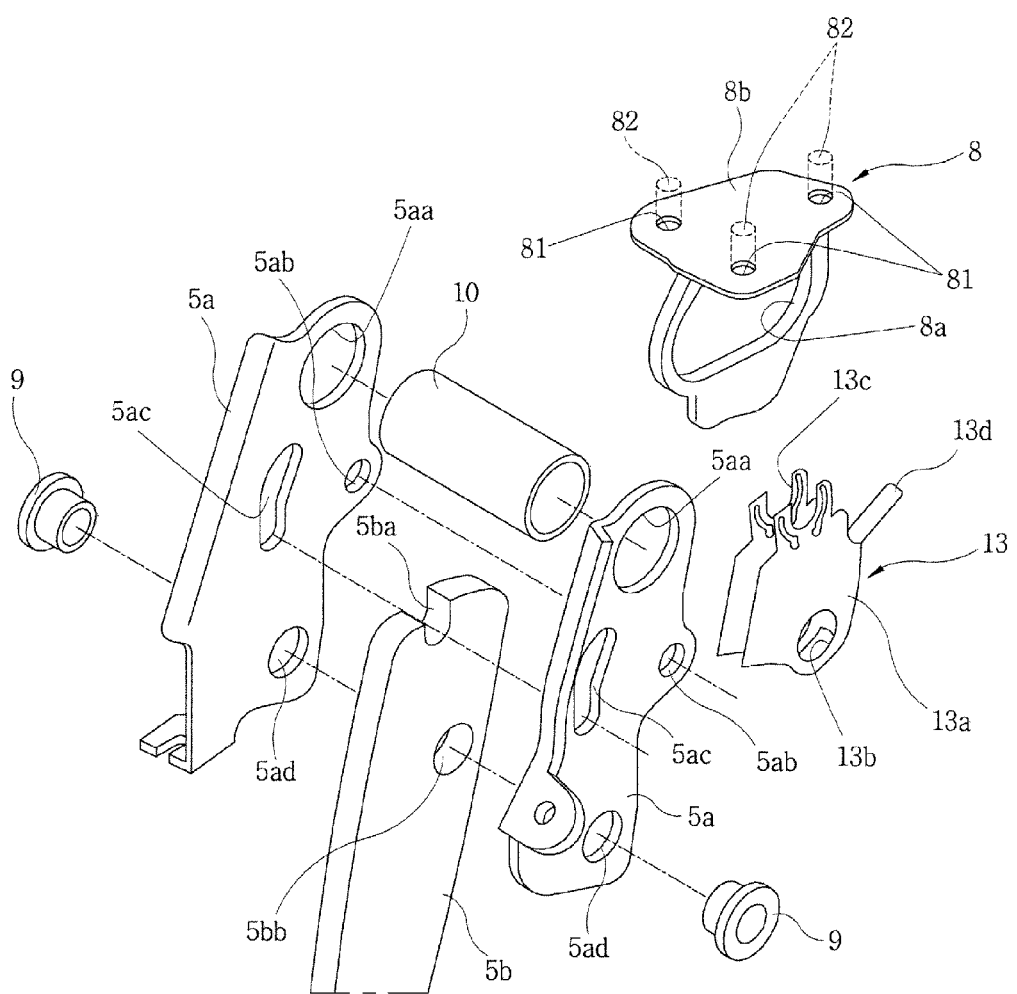
FIG. 7 is an exploded perspective view of the brake pedal according to the present invention.

Meanwhile, as shown in FIGS. 6 and 7, three locking bolt holes 81 are formed through a stopper 8, through which the hinge shaft 6 is inserted, and which serves as a guide means for guiding movement of the mounting bracket 4 when a vehicle collision takes place. Of three locking bolts 82, two locking bolts are consecutively inserted into two locking bolt holes of the stopper 8 and two locking bolt insertion notches 4a of the mounting bracket 4 and are then inserted into two locking bolt holes of the first flange 7a of the vehicle body fastening bracket 7. Subsequently, the two locking bolts are tightened by nuts. The one remaining locking bolt is inserted into the associated locking bolt hole of the first flange 7a of the vehicle body fastening bracket 7 through the associated locking bolt hole of the stopper 8 and is tightened by a nut.

FIG. 5 shows the mounting bracket 4 and the stopper 8 which are assembled with the vehicle body fastening bracket 7. Two locking bolts are also tightened into the vehicle body 3 through the two locking bolt holes formed through the second flange 7b of the vehicle body fastening bracket 7, so that the mounting bracket 4 and the stopper 8 are mounted to the vehicle body 3 by the vehicle body fastening bracket 7.

FIG. 6 shows an exploded perspective view of the mounting bracket 4 and the brake pedal 5. The hinge shaft 6, having a bolt shape, is inserted through the mounting bracket 4 and is then coupled to a nut. Furthermore, two bushings 9 are fitted at predetermined positions over the hinge shaft 6 for ease of rotation of the hinge shaft 6 with respect to the mounting bracket 4. A hinge shaft support pipe 10, through which the hinge shaft 6 is inserted and supported, is mounted both through the upper pedal arm 5a and through a guide hole 8a, formed through the stopper 8.

Meanwhile, a return spring 11, which returns the brake pedal 5 to its original position, is coupled at a first end thereof to the mounting bracket 4 and coupled at a second end thereof to the upper pedal arm 5a. When the brake pedal 5 is operated by the driver, the return spring 11 is stretched and thus stores elastic force. When the brake pedal 5 is released, the brake pedal 5 is returned to the original position thereof by the elastic force which has been stored in the return spring 11.

A stop lamp switch 12, which turns on or off a stop lamp depending on operation of the brake pedal 5, is coupled to the mounting bracket 4 using a nut.

FIG. 7 shows an exploded perspective view of the brake pedal 5. The upper pedal arm 5a is divided into two bodies, that is, a left upper pedal arm body and a right upper pedal arm body, on either side of the lower pedal arm 5b. A mounting hole 5aa, into which the hinge shaft support pipe 10 is fitted, is formed at a predetermined position through each of the left and right upper pedal arm bodies of the upper pedal arm 5a. To assemble the left and right upper pedal arm bodies with each other using a locking bolt, a locking bolt hole 5ab is formed at a predetermined position through each of the left and right upper pedal arm bodies of the upper pedal arm 5a. A locking pin insertion notch 5ba is formed in an upper end of the lower pedal arm 5b, and an arc-shaped slot 5ac is formed at a predetermined position through each of the left and right upper pedal arm bodies of the upper pedal arm 5a, so that a locking pin, which will be described later herein, is inserted into the arc-shaped slot 5ac and the locking pin insertion notch 5ba.

Furthermore, bushing seating holes 5ad and 5bb are respectively formed through a lower position of each of the left and right upper pedal arm bodies of the upper pedal arm 5a and an upper position of the lower pedal arm 5b, so that the bushings 9 are fitted into the bushing seating holes 5ad and 5bb from opposite sides of the upper pedal arm 5a.

The guide hole 8a, which is configured in an elliptical shape having a width larger than the diameter of the hinge shaft support pipe 10, is formed in the stopper 8. The stopper 8 includes a stopper flange 8b which is mounted to the vehicle body 3 using the three locking bolts tightened through the stopper flange 8b. The hinge shaft support pipe 10 is inserted through the guide hole 8a of the stopper 8 so that movement of the hinge shaft support pipe 10 is guided by the guide hole 8a.

A spacer 13 is fitted over the upper end of the lower peddel arm 5d. The spacer 13 includes a spacer body 13a which is formed by bending it in an approximately U shape. The spacer body 13a has a bushing seating hole 13b which is formed at a lower position through the spacer body 13a and corresponds to the bushing seating holes 5ad and 5bb, and a locking pin insertion notch 13c which is formed at an upper position through the spacer body 13a so that the locking pin, which will be discribed later herein, can be inserted into the locking pin insertion notch 13c. The spacer 13 further includes a leaf spring 13d which integrally extends outwards from the spacer body 13a at a predetermined angle. The leaf spring 13d serves to push the lower pedal arm 5d in the forward direction of the vehicle when a vehicle collision occurs. The leaf spring 13d may have a multi-layered structure which is constructed in two or more layers.

Figure 8:
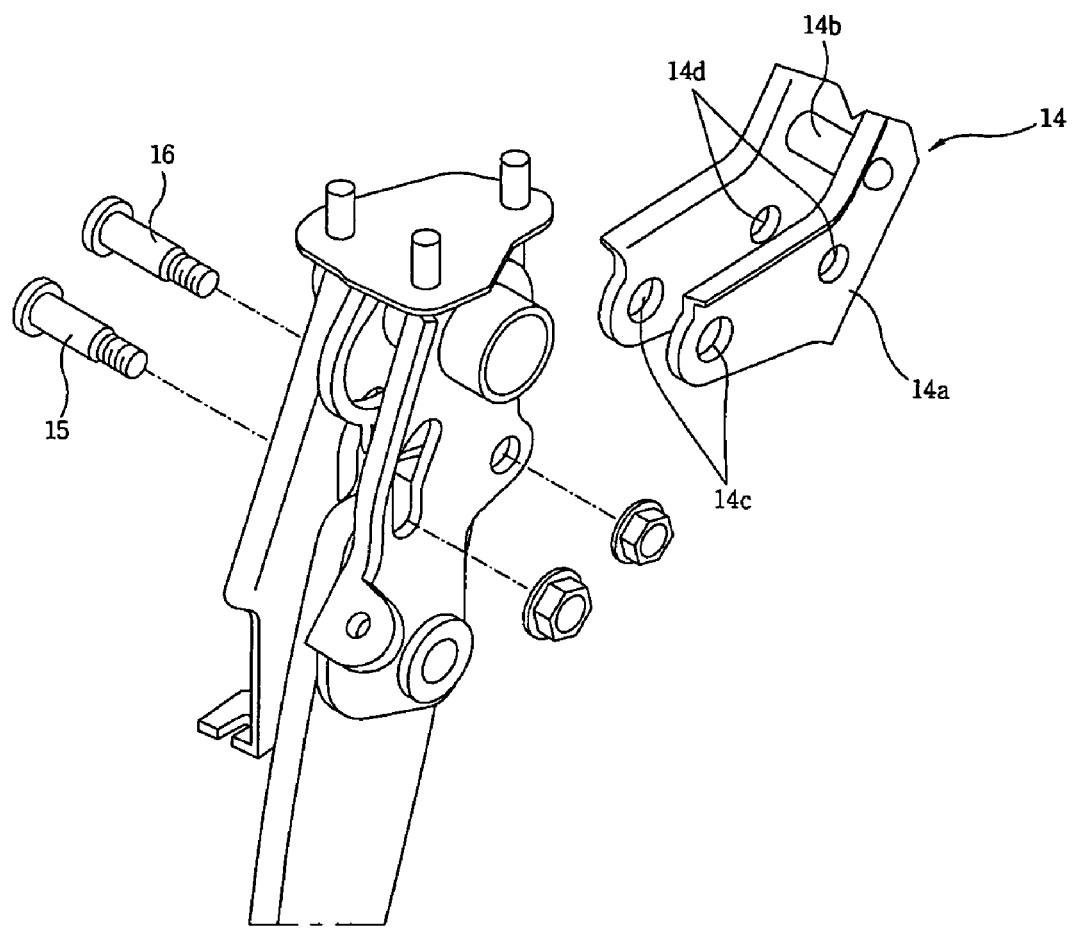
FIG. 8 is an exploded perspective view showing the brake pedal, an actuating lever, and a locking pin according to the present invention.

FIG. 8 shows an exploded perspective view of the brake pedal 5 and an actuating lever 14. The locking pin 15 is inserted through the arc-shaped slots 5ac of the upper pedal arm 5a and the locking pin insertion notch 5ba of the lower pedal arm 5b, so that the lower pedal arm 5b is coupled to the upper pedal arm 5a by the locking pin 15. A locking bolt 16 is inserted through the locking bolt holes 5ab, formed through the left and right upper pedal arm bodies, and is then tightened by a nut.

The actuating lever 14 includes an actuating lever body 14a which has an approximately U-shaped cross-section, and an actuating pin 14b which is provided at an upper position in the actuating lever body 14a. Furthermore, a locking pin insertion hole 14c, through which the locking pin 15 is inserted, and a locking bolt insertion hole 14d, through which the locking bolt 16 is inserted, are formed at predetermined positions through the actuating lever body 14a.

Figure 9:
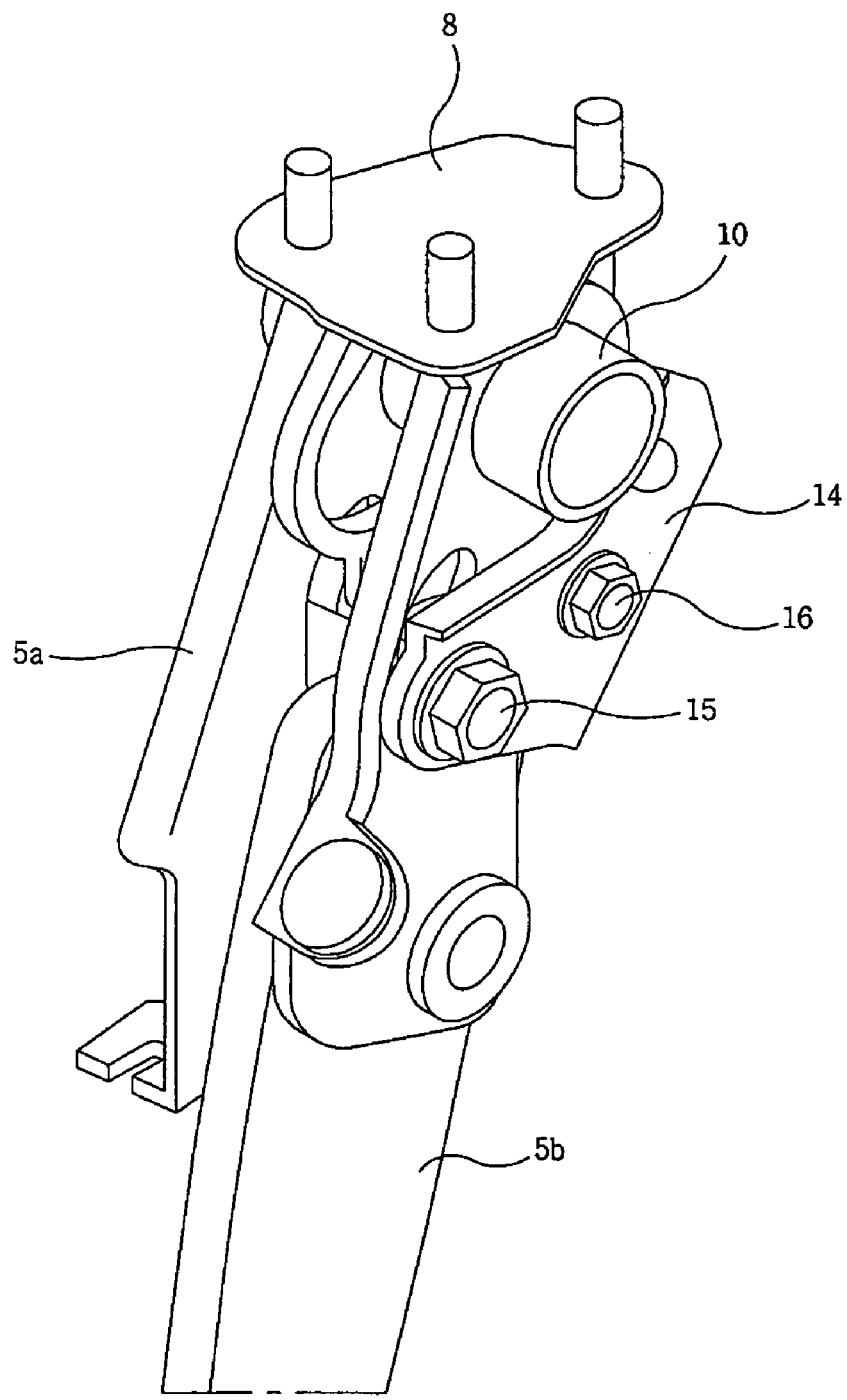
FIG. 9 is a perspective view showing the assembly of the brake pedal, the actuating lever and the locking pin of FIG. 8.

FIG. 9 shows the actuating lever 14 mounted to the upper end of the brake pedal 5.

Figure 10:
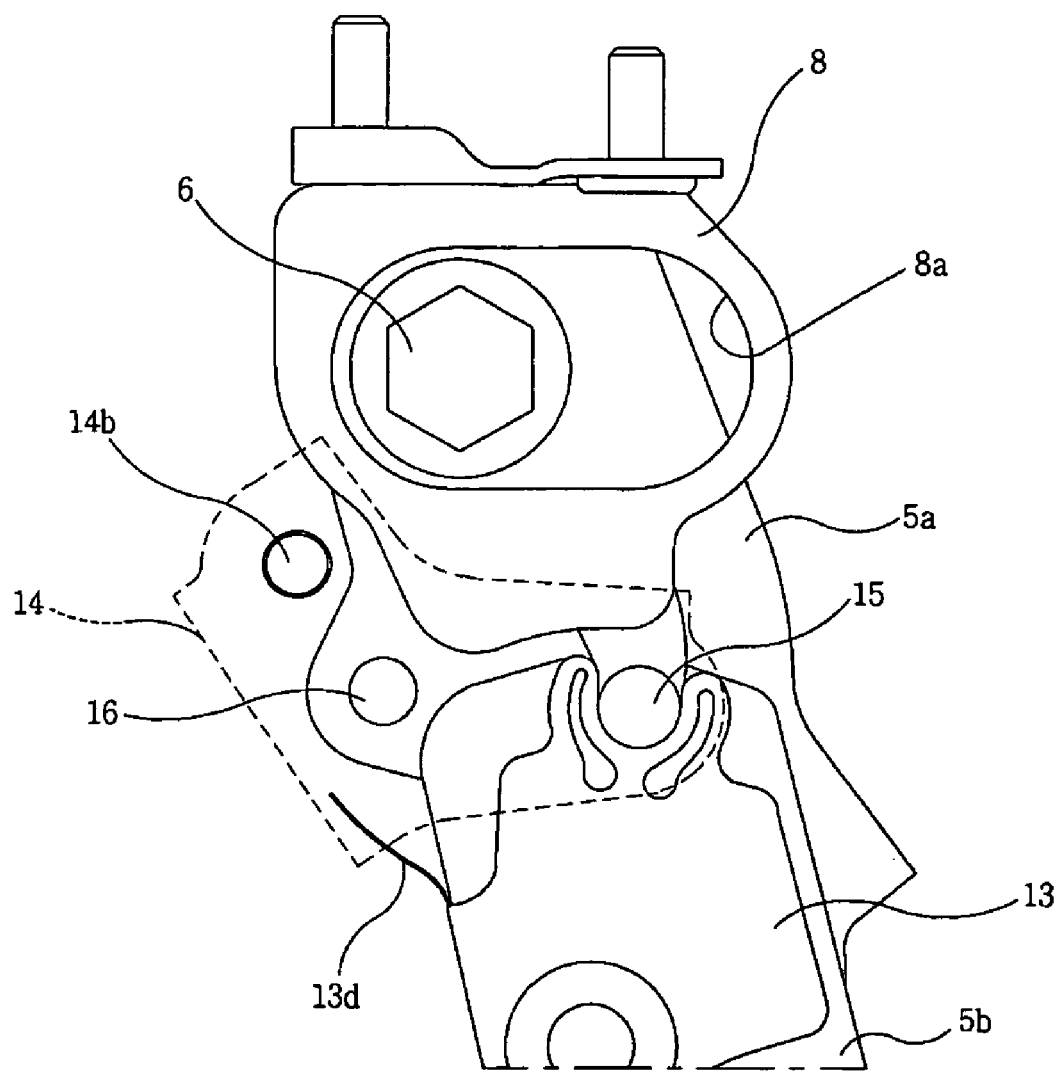
FIG. 10 is a view showing the normal state of the shock absorbing device assembled with the brake pedal, according to the present invention.

FIG. 10 shows the normal state of the brake pedal 5 provided with the shock absorbing device having the above-mentioned construction. In this state, the hinge shaft 6 is disposed in the guide hole 8a of the stopper 8 at a position adjacent to one end of the guide hole 8a. The locking pin 15 is inserted into the locking pin insertion notch 13c of the spacer 13, the arc-shaped slots 5ac of the upper pedal arm 5a and the locking pin insertion notch 5ba of the lower pedal arm 5b, so that the lower pedal arm 5b is coupled to the upper pedal arm 5a by the locking pin 15. An end of the leaf spring 13d of the spacer 13 is inserted in the actuating lever body 14a of the actuating lever 14. The leaf spring 13d is placed in a state of being slightly compressed by rotating it in a clockwise direction from the initial state thereof, in which no force is applied thereto.

Figure 11:
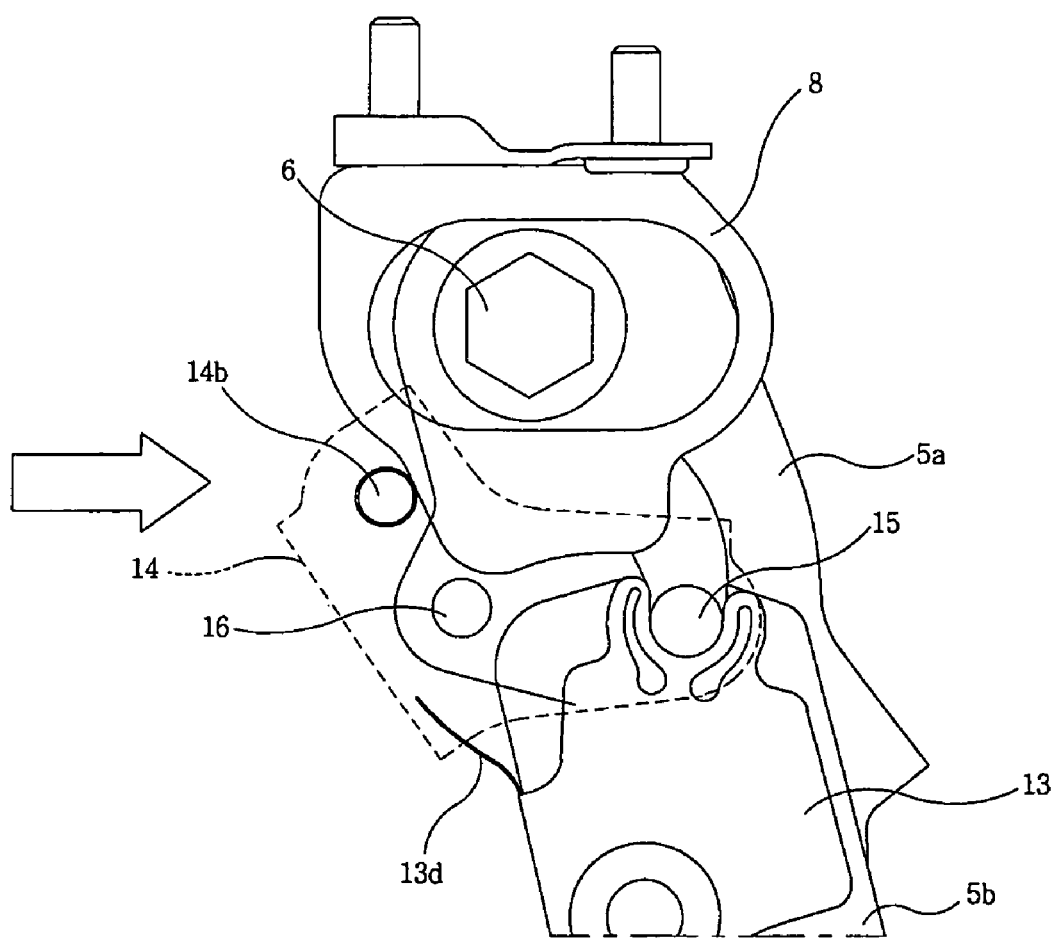
FIG. 11 is a side view showing the state of the shock absorbing device, mounted to the brake pedal, in an early stage of a vehicle collision, according to the present invention.

FIG. 11 shows the operation of the shock absorbing device of the present invention, mounted to the brake pedal 5, in an early stage of a vehicle collision. If the vehicle is in a frontal collision, the impact is transmitted to the mounting bracket 4 through the brake booster 2 and the dash panel 1, so that the mounting bracket 4 and the brake pedal 5 are pushed towards the driver. That is, because the two locking bolts, which fasten the stopper 8 to the vehicle body 3, are fitted into the locking bolt insertion notches 4a of the mounting bracket 4 so as to be allowed to slide, the mounting bracket 4 can be pushed in the direction of the driver. When the mounting bracket 4 and the brake pedal 5 are moved in the direction of the driver, the actuating pin 14b of the actuating lever 14 is brought into contact with an inclined edge 8c of the stopper 8.

Figure 12:
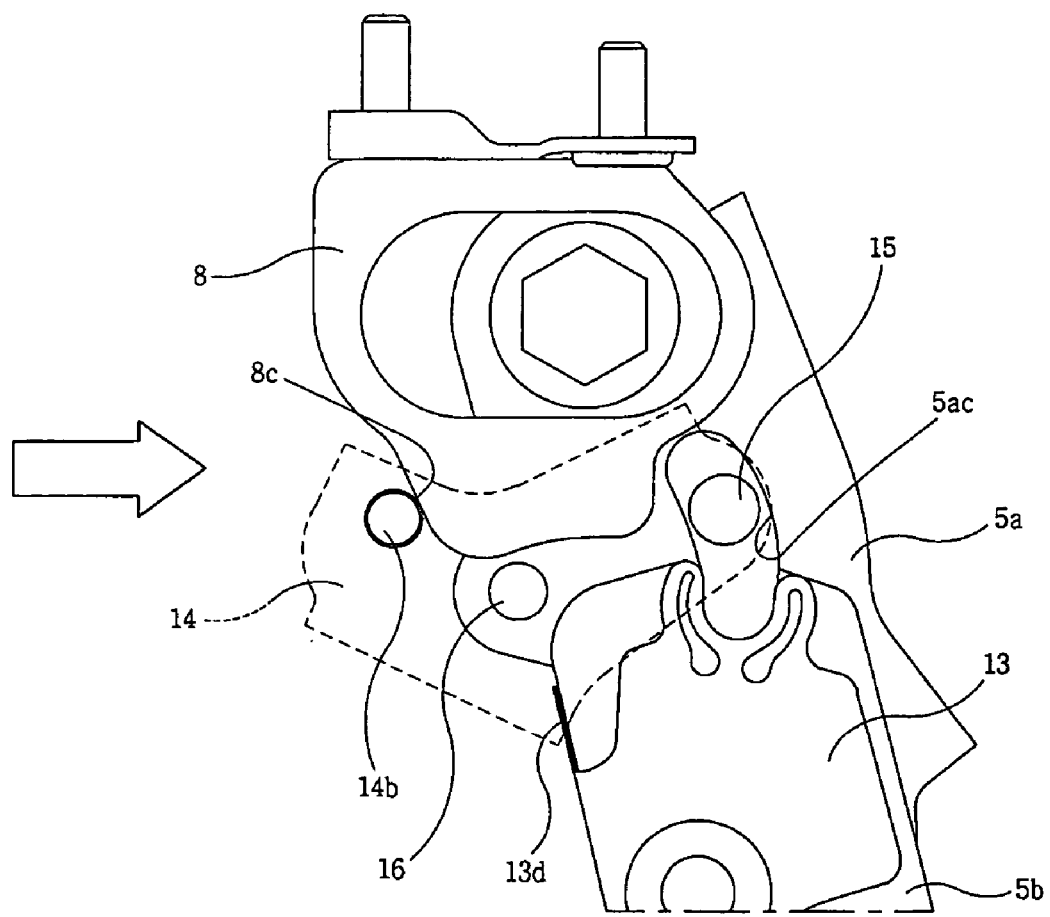
FIG. 12 is a side view showing the state of the shock absorbing device, mounted to the brake pedal, in a middle stage of the vehicle collision, according to the present invention.

FIG. 12 shows the state of the shock absorbing device of the present invention, mounted to the brake pedal 5, in a middle stage of the vehicle collision. Continuing, while the collision is in progress, the brake pedal 5 is pushed towards the driver, but the actuating pin 14b of the actuating lever 14 is moved downwards along the inclined edge 8c of the stopper 8 which is curved in a counterclockwise direction and has an arc shape similar to the shape of each arc-shaped slot 5ac of the upper pedal arm 5a. Therefore, the actuating lever 14 is rotated around the locking bolt 16 in a counterclockwise direction. Then, the locking pin 15, which is assembled with the actuating lever 14, is removed from the locking pin insertion notch 13c of the spacer 13 and the locking pin insertion notch 5ba of the lower pedal arm 5b and is moved along the arc-shaped slots 5ac of the upper pedal arm 5a in a counterclockwise direction. Thus, the lower pedal arm 5b is separated from the upper pedal arm 5a.

Figure 13:
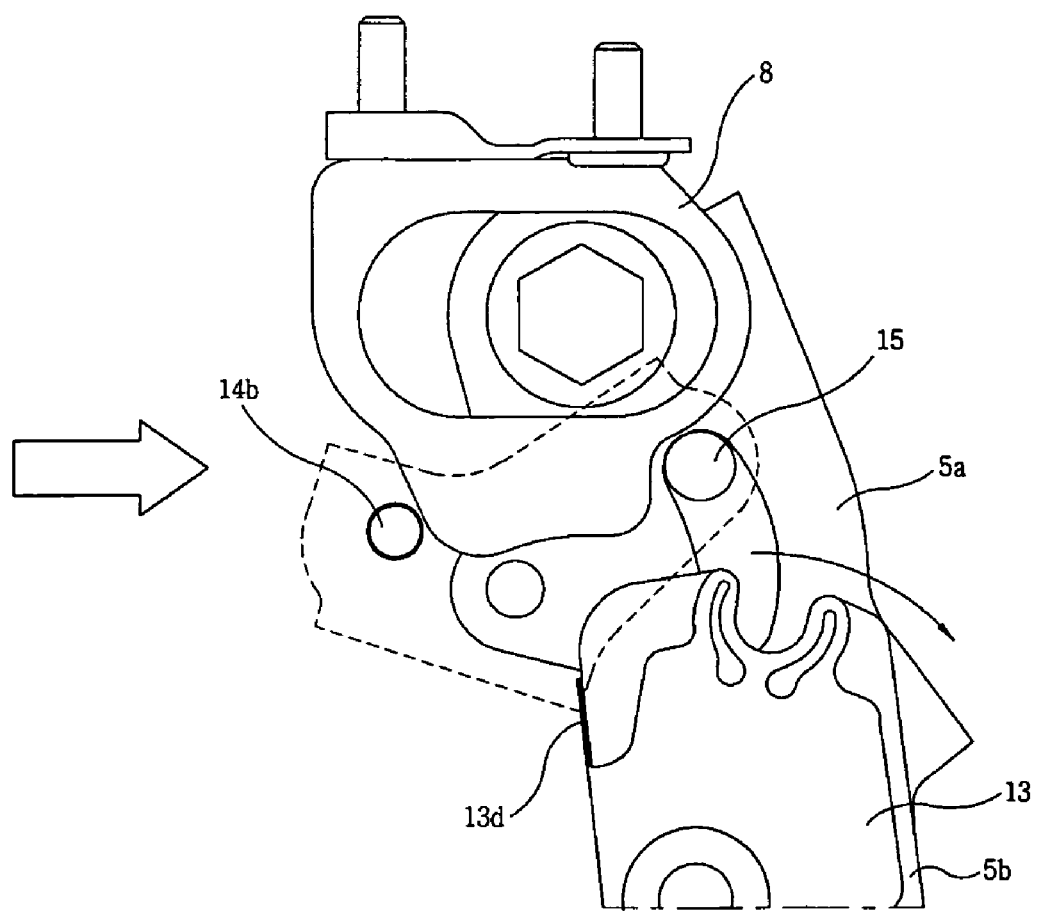
FIG. 13 is a side view showing the state of the shock absorbing device, mounted to the brake pedal, in a late stage of the vehicle collision, according to the present invention.

Continuing, while the collision is in progress, as shown in FIG. 13, the lower end of the actuating lever 14 is brought into contact with a corner of the upper end of the lower pedal arm 5b, thus rotating the lower pedal arm 5b in a clockwise direction. Simultaneously, the leaf spring 13d of the spacer 13 also rotates the lower pedal arm 5b using its elasticity in a clockwise direction.

Consequently, the lower pedal arm 5b is forcibly rotated by the actuating lever 14 and the leaf spring 13d in the forward direction of the vehicle, that is, in a direction moving away from the driver, thus reducing the speed of impact of the driver's leg against the brake pedal 5. Furthermore, the leaf spring 13d reliably prevents the brake pedal 5 from moving towards the driver, thus minimizing injury to the leg of the driver resulting from the collision against the brake pedal 5.

As is apparent from the foregoing, a shock absorbing device of a brake pedal according to the present invention has advantages in that, when a vehicle collision occurs, a lower pedal arm is removed from an upper pedal arm by an actuating lever and is forcibly rotated by the elasticity of a leaf spring in a direction moving away from a driver, so that the collision speed of the driver's leg against the brake pedal is reduced, thus markedly reducing injury to the leg of the driver resulting from impact with the brake pedal, thereby protecting the driver more effectively.

What is claimed is:

1. A shock absorbing device for brake pedals, comprising:
   a mounting bracket fastened at a first end thereof to a vehicle body and removably mounted at a second end thereof to the vehicle body;
   an upper pedal arm rotatably mounted to the mounting bracket using a hinge shaft;
   a lower pedal arm removably coupled to the upper pedal arm using a locking pin;
   locking pin removal means to remove the lower pedal arm from the upper pedal arm when a vehicle collision occurs;
   guide means for serving as a guide for movement of the mounting bracket when the vehicle collision occurs and for providing a reaction force for the locking pin removal means; and
   a spacer mounted to the lower pedal arm, and comprising a leaf spring, so that, when the vehicle collision occurs, the leaf spring is compressed by the locking pin removal means, thus rotating the lower pedal arm in a direction moving away from a driver using elasticity thereof.

2. The shock absorbing device as defined in claim 1, wherein the locking pin removal means comprises an actuating pin and has a U shape, the locking pin removal means being rotatably mounted to the upper pedal arm.

3. The shock absorbing device as defined in claim 2, wherein the guide means has an inclined part which is curved in a predetermined direction to guide the actuating pin in the vehicle collision.

4. The shock absorbing device as defined in claim 3, wherein the inclined part of the guide means has an arc shape similar to an arc-shaped slot formed through the upper pedal arm.

5. The shock absorbing device as defined in claim 1, wherein the guide means is fastened to the vehicle body, and the mounting bracket is coupled to the guide means such that the movement of the mounting bracket is guided by the guide means.

6. The shock absorbing device as defined in claim 1, wherein the guide means has an elliptical guide hole to limit moving distance of the hinge shaft in the vehicle collision.

7. The shock absorbing device as defined in claim 1, wherein the lower pedal arm is coupled at a predetermined position thereof to a push rod of a brake booster, so that, when the vehicle collision occurs, the lower pedal arm is removed from the upper pedal arm and rotated around a joint between the lower pedal arm and the push rod of the brake booster.

* * * * *